United States Patent [19]

Remein

[11] Patent Number: 4,926,427
[45] Date of Patent: May 15, 1990

[54] SOFTWARE ERROR DETECTION APPARATUS

[75] Inventor: Duane Remein, Rocky Point, N.Y.

[73] Assignee: Siemens Aktiengesellschaft, Berlin and Munich, Fed. Rep. of Germany

[21] Appl. No.: 333,752

[22] Filed: Apr. 3, 1989

Related U.S. Application Data

[63] Continuation of Ser. No. 913,799, Sep. 30, 1986, abandoned.

[51] Int. Cl.$^5$ .............................................. G06F 11/00
[52] U.S. Cl. .................................... 371/67.1; 371/62; 371/19
[58] Field of Search ........................ 371/12, 13, 19, 21, 371/25, 62, 67, 21.1, 25.1, 67.1; 364/200 MS File, 900 MS File; 365/200, 201

[56] References Cited

U.S. PATENT DOCUMENTS 4,649,537  3/1987  Rosswurm ..................... 371/62 X
4,683,568  7/1987  Urban .................................. 371/12
4,696,002  9/1987  Schleupen ...................... 371/62 X

OTHER PUBLICATIONS

M. L. Carnes, "Processor Checking", IBM TDB, vol. 17, No. 11, Apr. 1975, pp. 3188-3189.

*Primary Examiner*—Jerry Smith
*Assistant Examiner*—Robert W. Beausoliel
*Attorney, Agent, or Firm*—Jeffrey P. Morris

[57] ABSTRACT

A software error detection circuit is described which supplements the known concept of a simple watch dog timer. The same clock pulse used to clock and time out a watch dog timer implements the addressing of a program memory. A comparison is then made of output data with data on a data bus. A failed comparison then raises an alarm faster and more efficiently than a timer circuit alone. Furthermore, in a parallel data bus environment a predetermined data check of adjacent bus line data is recommended over an all data or a random data check.

3 Claims, 2 Drawing Sheets

FUNCTIONAL BLOCK DIAGRAM
WATCH DOG TIMER

FUNCTIONAL BLOCK DIAGRAM
WATCH DOG TIMER

SOFTWARE ERROR DETECTION APPARATUS

This application is a continuation of application Ser. No. 06/913,799 filed Sept. 30, 1986, now abandoned.

BACKGROUND OF THE INVENTION

1. Technical Field

The present invention relates to the field of validating data and, more particularly to the detection of errors in software operational commands and data retrieval from random access memory.

2. Description of the Prior Art

Software, upon retrieval from program memory where it is stored, is run by a central processing unit. Occasionally, the retrieval processor other factors can create errors in the commands and data retrieved so that the software, when run, can enter an endless loop or can get lost outside of its normal flow and execute garbage results. Obviously, in these instances, the software becomes no longer predictable when it is run and can not be perfectly designed to anticipate these errors, correct itself or to raise an alarm.

In such cases, it is believed known in the art to implement a timer either directly associated with the central processing unit or indirectly at a peripheral unit where some form of expected action is to take place within a predetermined period of time. Such timers then are called upon to be initiated by the central processing unit, wait until the predetermined period of time expires and then initiate an alarm. Thereafter, the software, for example, can be recalled from memory, and the process the software is responsible for controlling, can be reinitiated.

Such a known technique has been appropriately named a "watch dog timer". The problem with such a technique is that the process is inherently slow and fails to react to potential errors as they occur. Consequently, there is a need, especially in real time environments, such as in the art of designing program controlled telecommunications transmission and switching equipment, for a more responsive arrangement where software errors can be detected more quickly and efficiently.

SUMMARY OF THE INVENTION

The problems and related problems of the prior art watch dog timer and related devices are overcome by the principles of the present circuit arrangement which incorporates a parallel data checking capability with the timing arrangement.

Each clock pulse of the watch dog timer serves a dual function in that a program memory is also addressed during that incremental time interval. Data stored in program memory retrieved at the positive edge of the clock pulse is compared with data stored in the program memory.

Of perhaps equally great interest is the principles taught by the present invention in selecting data from program memory for comparison. A perfect all data selection or an entirely random selection is conceivable. However, by following certain principles taught by the present invention, a predefined selection of data has been found to be of greater advantage and almost efficient as a perfect all data check in the present situation.

In particular, it has been found, for example, that software retrieval errors more typically occur on adjacent bus lines of a parallel bus structure i.e. from noise, grounding, cross talk, and so on. Checks of repetitive bit states should be minimized, for example, two or at most three adjacent bus lines should be checked. Also, a check for repetition of bit sequences should be avoided if possible. Such principles if practiced in particular applications will achieve faster and more efficient results then performing a perfectly random data check.

Even more advantages will become apparent to one ordinarily skilled in the art from a study of the drawings and the following detailed description of the present invention.

DETAILED DESCRIPTION

Figure 1:
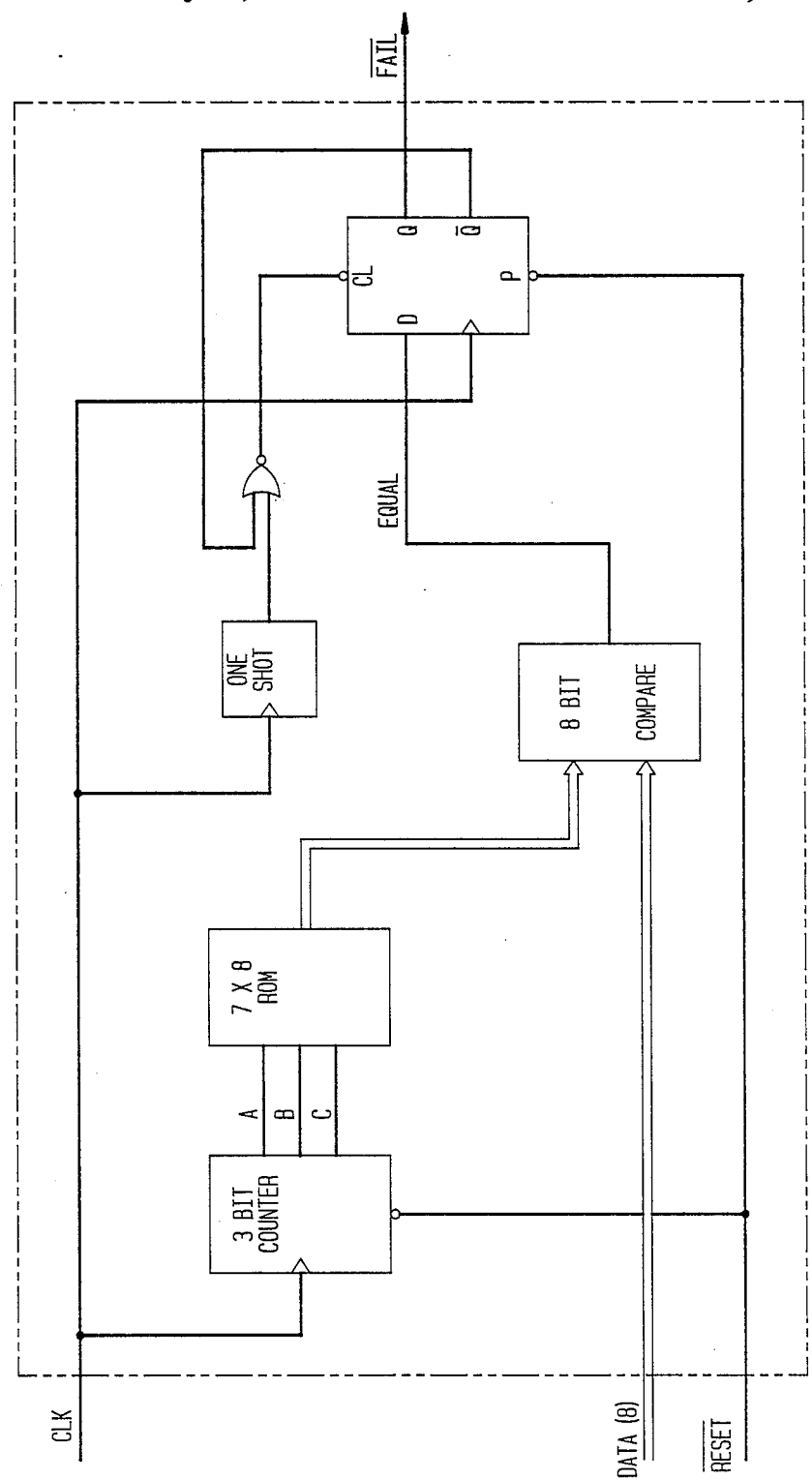
FIG. 1 is a schematic drawing showing the present invention comprising a clock pulse generator for addressing a program memory and for actuating a time out circuit, either the timing out of the time out circuit or the detection of a sfotware data error actuating an alarm condition.

Referring to the drawing, FIG. 1, there is shown a circuit for implementing a software error detection method which goes beyond the normally provided so-called watch dog timer circuits known in the art. In particular, there is typically a clock pulse generator, not shown, whose output CLK clocks a one shot multivibrator in combination with a counter such that after a predetermined period of time has lapsed a signal FAIL is output from the counter.

In the present arrangement, the output of the clock pulse generator is also provided to counter CT which may be a three bit counter for addressing a program memory PM. This program memory, in the example of providing a three bit counter may be a memory for storing seven 8 bit bytes. The output of the addressed program memory on the leading edge of the clock pulse is transmitted to comparator COM, for example, in this situation, an 8 bit comparator to which are also provided data bits DATA for comparison.

Upon initialization the input RESET to counter/flip-flop decision circuit DC is set to 0, the three bit counter cleared and flip-flop DC set to "not failed" or FAIL=0. This decision circuit DC is of the well known "D" type flip flop such as a 74 HC 74 or a part of a programmable device such as an MMI 16 R 4 type integrated circuit.

After input RESET becomes 1, the clock pulses actuate the counting and addressing of memory until either the time out circuit TD times out or a mismatch occurs at a comparator COM.

Whichever event occurs first generates a failure alarm and the flop DC will latch in the failed state. Thus, there has been shown a simple implementation of the present invention without any particular concern as to what data is checked in program memory and so may be most easily considered either a random data check or a perfect or all data check method.

Figure 2:
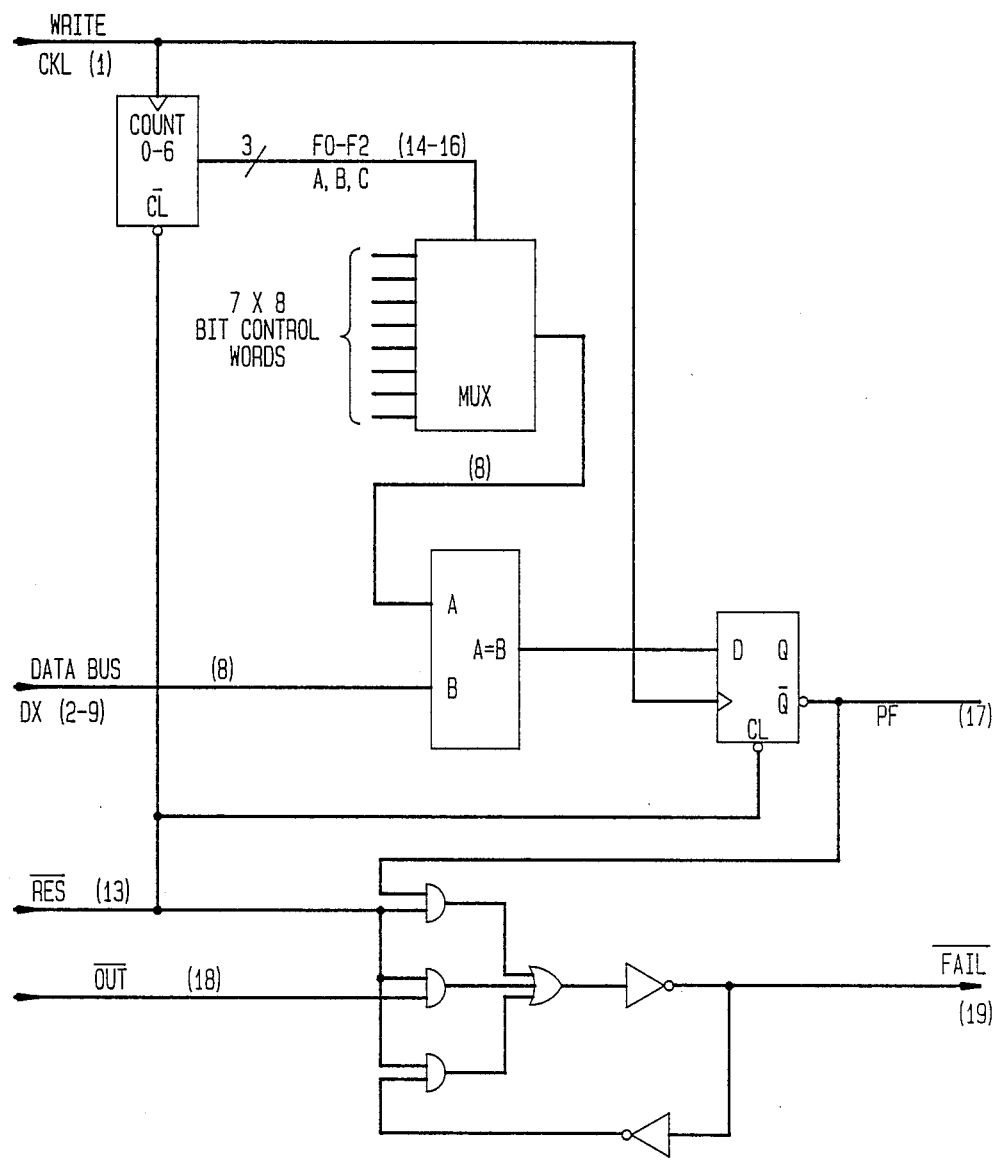
FIG. 2 shows a second schematic drawing for particular implementation with an 8 bit parallel data bus where the program memory is loaded in a predetermined rather than a random manner.

Referring to FIG. 2, there is shown a specific implementation where a multiplexer MUX is loaded in predefined manner with 1 of 7 eight bit control words. The multiplexer MUX includes seven 8-bit input terminals, each coupled to respective sources (not shown) of seven control words. In response to the 3-bit signal from counter COUNT, one of the control words is coupled to the output terminal of multiplexer MUX in a known manner. The embodiment especially assures an 8 bit parallel bus line practical with 8 bit microprocessors known in the art. However, the principles taught here are equally applicable to other parallel bus structures in higher order microprocessor (i.e. 16 or 32 bit) configurations. The hexadecimal words AA 55, BB, 66, 99, 96, and 2D were picked following the following principles for such a parallel data bus environment. Firstly, data on adjacent bus lines is more likely to be in error than data on non-adjacent bus lines; therefore, it is recommended that adjacent bits be toggled relative to each other as often as possible. For example, AA and 55 represent 01010101 and 10101010 respectively. Secondly, to minimize the time to detect software failures, repetative bit states between bit sequences should be minimized. For example, only two or a maximum of three repetitive bit states should be tested in practice; i.e. the numbers 66 and 99 check alternating pairs of parallel bus leads, 01100110 and 10011001 respectively. Lastly, no individual bit sequence should be identical to any other bit sequence if possible. For example, 96 is chosen for this reason where 1001 is not followed but rather one should choose 0110 which follows 1001 as an inverse.

Thus there has been shown and described a novel circuit arrangement and method for detecting software errors quickly and efficiently which meets the advantages sought and should only be considered to be limited in scope by the claims which follow.

What is claimed is:

1. A circuit for the detection of software errors comprising:
   a timer circuit clocked by a clock pulse for providing an output when a predetermined period of time lapses;
   a control circuit for providing a sequence of data output values responsive to the clock pulse, comprising a counter responsive to said clock pulse, and a multiplexer;
   a comparator for comparing each one of said sequence of data output values from the control circuit with a data bus and for generating an output signal when the one of the data output values from the control circuit does not equal the corresponding one of the data input values from the data bus; and
   a decision circuit for generating an alarm signal when either the predetermined period of time lapses or the comparaator generates the output signal.

2. The circuit of claim 1 wherein said control circuit comprises a counter responsive to said clock pulse.

3. The circuit of claim 2 wherein said control circuit further comprises a read only memory.

* * * * *